(12) United States Patent
Minagata et al.

(10) Patent No.: US 9,692,021 B2
(45) Date of Patent: Jun. 27, 2017

(54) ELECTRICAL STORAGE DEVICE WITH IMPROVED SEALING PROPERTY

(71) Applicant: KABUSHIKI KAISHA TOYOTA JIDOSHOKKI, Kariya-shi, Aichi-ken (JP)

(72) Inventors: Atsushi Minagata, Kariya (JP); Motoaki Okuda, Kariya (JP); Hiroyasu Nishihara, Kariya (JP)

(73) Assignee: KABUSHIKI KAISHA TOYOTA JIDOSHOKKI, Aichi (JP)

(*) Notice: Subject to any disclaimer, the term of this patent is extended or adjusted under 35 U.S.C. 154(b) by 191 days.

(21) Appl. No.: 14/427,041

(22) PCT Filed: Sep. 10, 2013

(86) PCT No.: PCT/JP2013/074325
§ 371 (c)(1),
(2) Date: Mar. 10, 2015

(87) PCT Pub. No.: WO2014/042135
PCT Pub. Date: Mar. 20, 2014

(65) Prior Publication Data
US 2015/0243935 A1    Aug. 27, 2015

(30) Foreign Application Priority Data
Sep. 13, 2012 (JP) .................. 2012-201336

(51) Int. Cl.
*B01J 7/00*     (2006.01)
*H01M 2/02*     (2006.01)
(Continued)

(52) U.S. Cl.
CPC .......... *H01M 2/0237* (2013.01); *H01G 11/74* (2013.01); *H01G 11/78* (2013.01);
(Continued)

(58) Field of Classification Search
CPC combination set(s) only.
See application file for complete search history.

(56) References Cited

U.S. PATENT DOCUMENTS 5,834,134 A * 11/1998 Hooke .................. H01M 2/305
                                                    429/181
5,856,041 A *  1/1999 Inoue ...................... H01M 2/06
                                                    429/182
(Continued)

FOREIGN PATENT DOCUMENTS

JP       54-6012 Y1    3/1979
JP       6-86259 U    12/1994
(Continued)

OTHER PUBLICATIONS

Machine translation of JP 2009-110687 A.*
(Continued)

*Primary Examiner* — Imran Akram
(74) *Attorney, Agent, or Firm* — Sughrue Mion, PLLC

(57) ABSTRACT

An electrical storage device includes a case, an electrode assembly accommodated in the case, an electrode terminal, a terminal insulating member, and an annular sealing member. The electrode terminal has a base located inside the case and a polar column portion, which projects from the base. An inner surface of the case at the circumference of the through hole and/or a tip end of the terminal insulating member on the side corresponding to the base has a tapered portion. A cross-sectional shape of the tapered portion in a direction in which the base and the inner surface face of the case each other is inclined to the outside in the radial direction of the through hole from the side corresponding to the base toward the through hole.

6 Claims, 9 Drawing Sheets

(51) Int. Cl.
*H01M 2/06* (2006.01)
*H01M 2/08* (2006.01)
*H01M 2/30* (2006.01)
*H01G 11/74* (2013.01)
*H01G 11/78* (2013.01)
*H01G 11/82* (2013.01)
*H01M 10/0525* (2010.01)
*H01G 11/80* (2013.01)

(52) U.S. Cl.
CPC .............. *H01G 11/82* (2013.01); *H01M 2/06* (2013.01); *H01M 2/08* (2013.01); *H01M 2/307* (2013.01); *H01M 10/0525* (2013.01); *H01G 11/80* (2013.01); *H01M 2220/20* (2013.01); *Y02E 60/13* (2013.01); *Y02T 10/7022* (2013.01)

(56) References Cited

U.S. PATENT DOCUMENTS

| | | | | |
|---|---|---|---|---|
| 6,137,053 | A * | 10/2000 | Andou | H01G 11/80 174/50.56 |
| 2002/0039678 | A1* | 4/2002 | Higa | H01M 2/024 429/183 |
| 2003/0207172 | A1* | 11/2003 | Misra | H01M 2/307 429/181 |
| 2004/0100039 | A1* | 5/2004 | Groh | F16J 15/061 277/628 |
| 2005/0095502 | A1* | 5/2005 | Sugimune | H01M 2/06 429/180 |
| 2010/0028759 | A1* | 2/2010 | Ebine | H01M 2/08 429/53 |
| 2011/0183195 | A1* | 7/2011 | Nngai | H01M 2/30 429/181 |
| 2011/0294001 | A1* | 12/2011 | Byun | H01M 2/06 429/181 |

FOREIGN PATENT DOCUMENTS

| | | |
|---|---|---|
| JP | 2000-048803 A | 2/2000 |
| JP | 2000-149915 A | 5/2000 |
| JP | 2000-215880 A | 8/2000 |
| JP | 2003-115286 A | 4/2003 |
| JP | 2006-324178 A | 11/2006 |
| JP | 2009-110687 A | 5/2009 |
| JP | 2009-134985 A | 6/2009 |

OTHER PUBLICATIONS

International Preliminary Report on Patentability dated Mar. 17, 2015, issued by the International Searching Authority in counterpart Application No. PCT/JP2013/074325.
International Search Report of PCT/JP2013/074325 dated Nov. 5, 2013 [PCT/ISA/210].

* cited by examiner

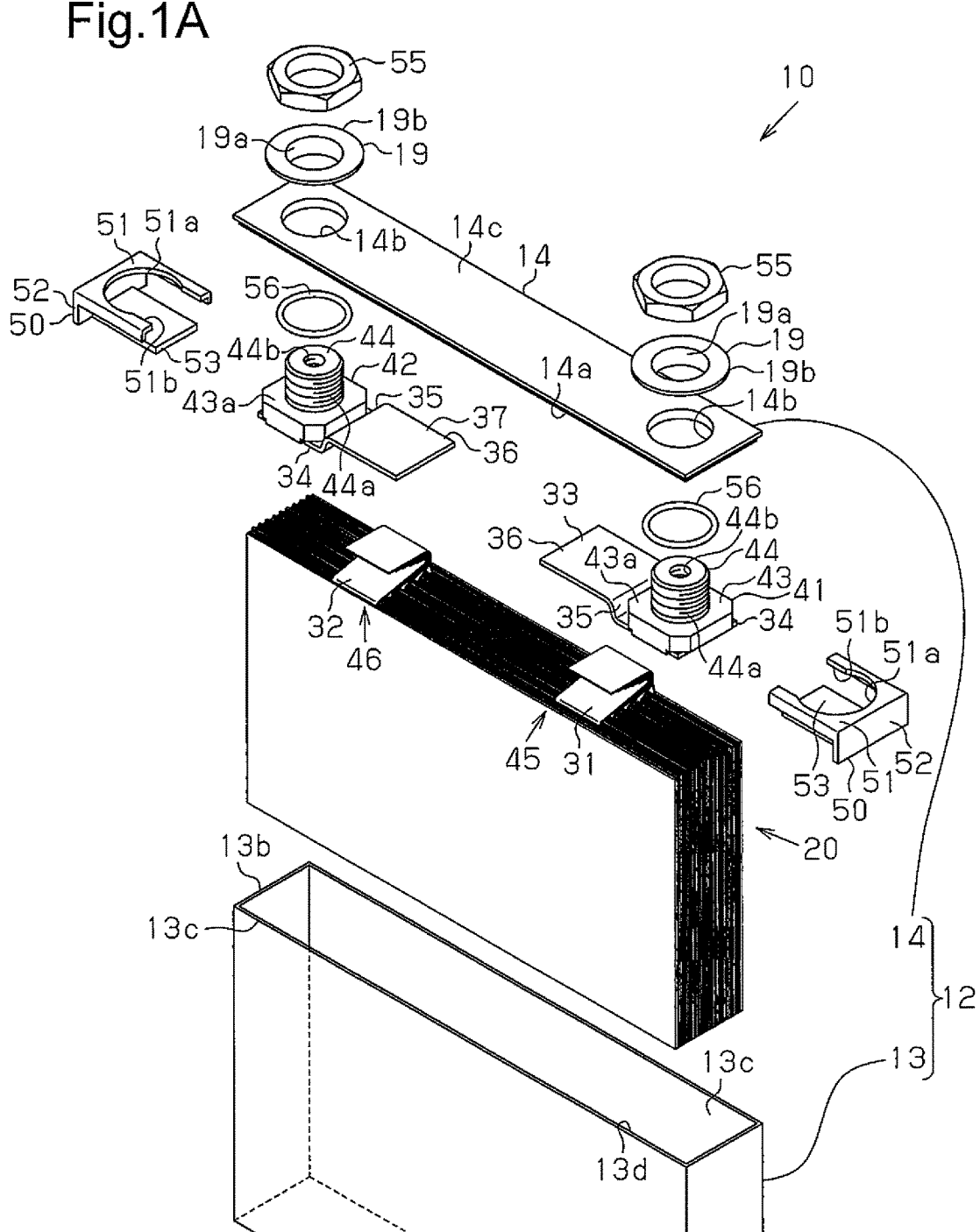
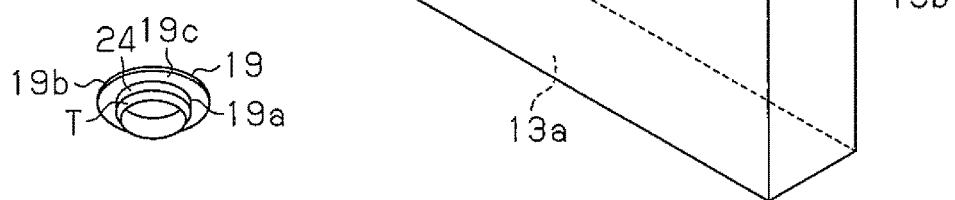

Fig.10A
Fig.10B
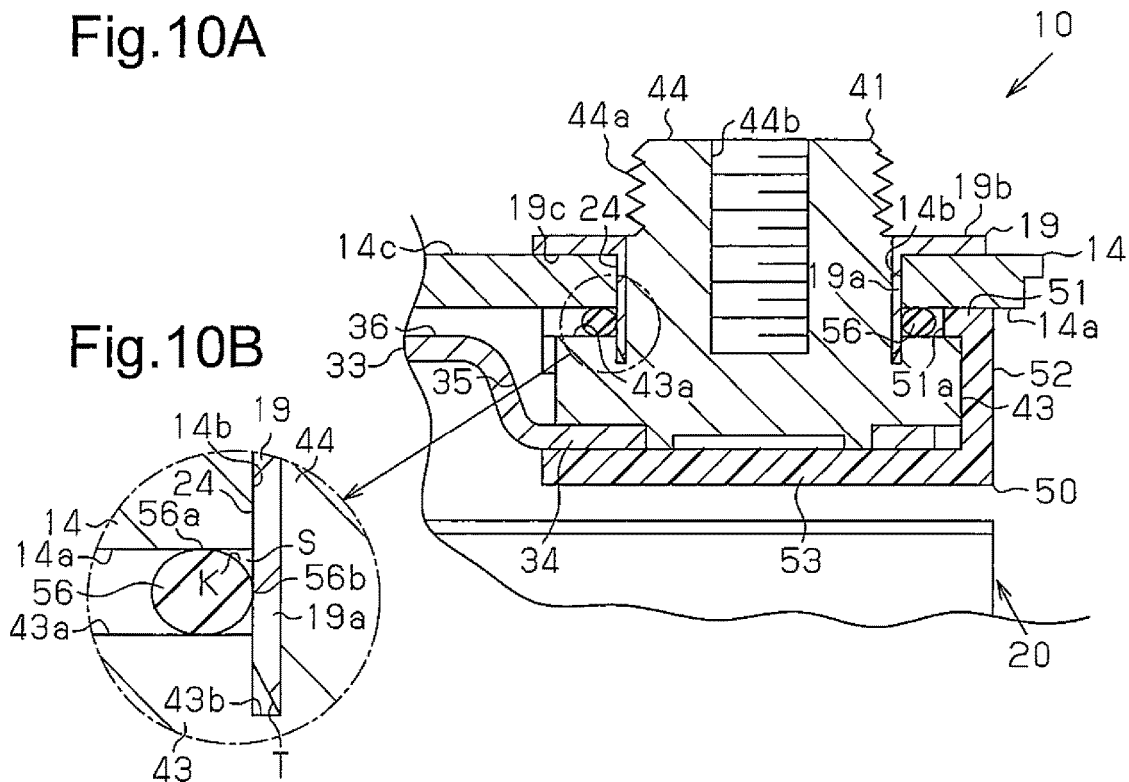
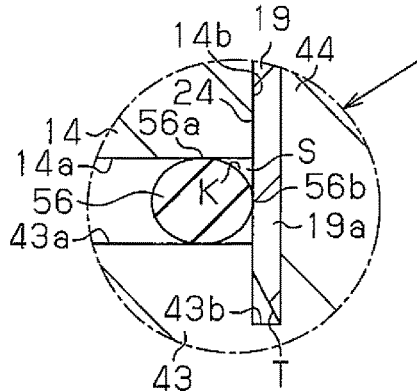
Fig.11A
Fig.11B
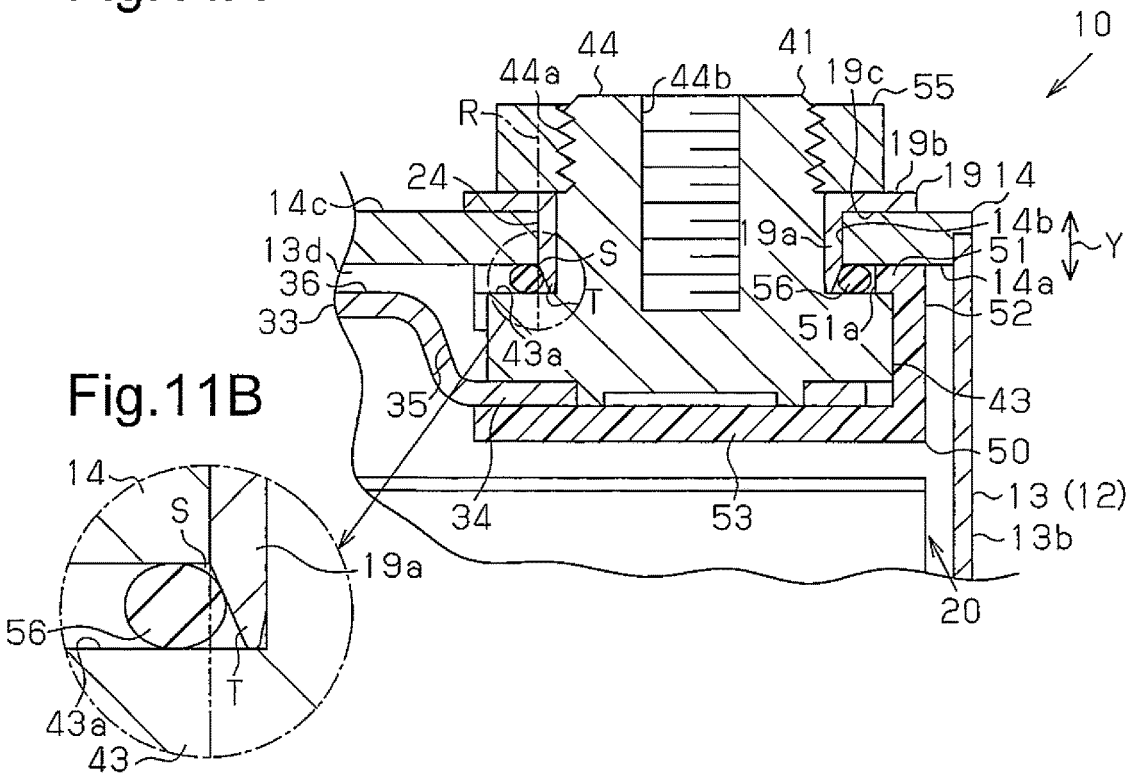
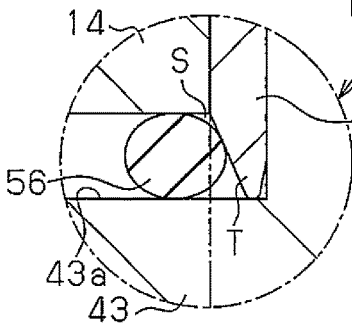

ELECTRICAL STORAGE DEVICE WITH IMPROVED SEALING PROPERTY

CROSS REFERENCE TO RELATED APPLICATIONS

This application is a National Stage of International Application No. PCT/JP2013/074325, filed Sep. 10, 2013, claiming priority based on Japanese Patent Application No. 2012-201336, filed Sep. 13, 2012, the contents of all of which are incorporated herein by reference in their entirety.

FIELD OF THE INVENTION

The present invention relates to an electrical storage device, which includes an electrode terminal electrically connected to an electrode assembly, a terminal insulating member inserted between the inner circumferential surface of a through hole and the outer circumferential surface of a polar column portion, which faces the inner circumferential surface, and an annular sealing member sandwiched between the inner surface of a lid, which faces a case body, and a seat surface of the electrode terminal, which faces the inner surface.

BACKGROUND OF THE INVENTION

A vehicle such as an electric vehicle (EV) and a plug-in hybrid vehicle (PHV) is equipped with a rechargeable battery as an electrical storage device that stores a power supply to a motor for running the vehicle. Some rechargeable batteries have a case that accommodates an electrode assembly. The case is formed by welding a case body and a lid to each other. An electrode terminal is electrically connected to the electrode assembly accommodated in the case body. The body of the electrode terminal is cylindrical. The electrode terminal is arranged to pass through a through hole of the lid and protrudes from the inside to the outside of the case body. An insulating distance is ensured in a gap between the inner circumferential surface of the through hole and the outer circumferential surface of the electrode terminal, which faces the inner circumferential surface. A sealing structure of the above gap is provided in the rechargeable battery. For example, refer to Patent Document 1.

As shown in FIG. 13, a battery 80 of Patent Document 1 is configured such that an exterior can 83 formed by welding a lid body 82 on each end of a cylindrical body 81 accommodates a winding electrode body 84. An electrode terminal mechanism 85 is attached to the lid body 82, and the winding electrode body 84 and the electrode terminal mechanism 85 are connected to each other.

The electrode terminal mechanism 85 includes a positive electrode extending terminal 86 formed of a screw member attached through the lid body 82 of the exterior can 83. The basal end of the positive electrode extending terminal 86 includes a flange portion 86a. An insulating member 87 made of plastic is provided in a gap between the inner circumferential surface of the through hole 82a and the outer circumferential surface of the positive electrode extending terminal 86. The insulating member 87 ensures a sealing property and an electrically insulating property between the lid body 82 and the positive electrode extending terminal 86. A washer 88 fits from the outside of the exterior can 83 onto the positive electrode extending terminal 86, and a first nut 89a and a second nut 89b are threaded to the positive electrode extending terminal 86. The first nut 89a is threaded and the insulating member 87 is sandwiched and pressed between the flange portion 86a of the positive electrode extending terminal 86 and the washer 88. This improves the sealing property of the through hole 82a.

However, in Patent Document 1, to ensure the sealing property of the through hole 82a, it is necessary to swage the insulating member 87 having a complicated shape and bring the complex surface into close contact with the circumference of the through hole 82a. Since the shape of the insulating member 87 is complicated and the installation of the insulating member 87 is troublesome, the formation of the sealing structure is also troublesome. Patent Document 2 discloses that an O-ring with a simple structure is employed as a sealing member.

As shown in FIG. 14, in a sealed type battery 90 in Patent Document 2, a lid body 91 includes a terminal drawing hole 91a. A positive electrode terminal 92 attached to the terminal drawing hole 91a includes an inner member 93 and an outer member 94. Sealing member compression portions 93a and 94a of the inner member 93 and the outer member 94 include annular grooves 93b and 94b. Sealing members 95 and 96 configured by O-rings are mounted on the corresponding annular grooves 93b and 94b. The inner member 93 and the outer member 94 are welded to each other. This sandwiches the sealing member 95 between the lid body 91 and the sealing member compression portion 93a and the sealing member 96 between the lid body 91 and the sealing member compression portion 94a in the compressed manner. The mounting of the sealing members 95 and 96 on the corresponding annular grooves 93b and 94b limits the positional displacement of the sealing members 95 and 96.

However, in Patent Document 2, it is necessary to precisely mount the sealing member 95 on the annular groove 93b. This results in a poor operability when assembling. In this regard, as in Patent Document 3, a configuration has been proposed in which an O-ring is inserted into a positive electrode terminal and a negative electrode terminal to sandwich the O-ring between the flat surfaces of the lid plate and the seat surface of each terminal.

PRIOR ART DOCUMENTS

Patent Documents

Patent Document 1: Japanese Laid-Open Patent Publication No. 2000-149915
Patent Document 2: Japanese Laid-Open Patent Publication No. 2009-134985
Patent Document 3: Japanese Laid-Open Patent Publication No. 2000-48803

SUMMARY OF THE INVENTION

In Patent Document 3, the O-ring is positioned by contacting the outer circumferential surface of the positive electrode terminal or the negative electrode terminal, the seat surface of the positive electrode terminal or the negative electrode terminal, and the inner surface of the lid plate. Such a structure is assembled in the following order. First, each O-ring passes through the corresponding terminal, and the terminal then passes through the through hole of the lid plate. An insulating packing is attached, and a nut is then fastened. Accordingly, if a part of the O-ring is displaced toward the center of the terminal when attaching the insulating packing, a part of the O-ring is sandwiched between the insulating packing and the seat surface of the terminal. In such a state, since the contact pressure of the contact portion between the O-ring and the lid plate or between the O-ring and the seat surface of the terminal is not even. This decreases the sealing property.

An objective of the present invention is to provide an electrical storage device that easily locates a sealing member in a position in which the sealing member exhibits a sealing property.

In order to achieve the above described objective, an electrical storage device includes a case, an electrode assembly accommodated in the case, an electrode terminal, a terminal insulating member, and an annular sealing member. The case has a through hole, through which an electrode terminal passes. The electrode terminal passes through the through hole and is electrically connected to the electrode assembly. The electrode terminal includes a base, which is located in the case and has a cross-sectional area that is greater than an area of the through hole, and a polar column portion, which projects from the base and is arranged to pass from an inside of the case through the through hole and protrudes to an outside of the case. The terminal insulating member is inserted between an inner circumferential surface of the through hole and an outer circumferential surface of the polar column portion, which faces the inner circumferential surface. The annular sealing member is sandwiched between an inner surface of the case and a seat surface of the base, which faces the inner surface. At least one of the inner surface of the case at a circumference of the through hole and a tip end of the terminal insulating member on a side corresponding to the base has a tapered portion, and a cross-sectional shape of the tapered portion in a direction in which the base and the case inner surface face each other is inclined to the outside in a radial direction of the through hole from the side corresponding to the base toward the through hole.

According to this, it is assumed that when the sealing member is mounted on the polar column portion and located on the seat surface of the base to locate the sealing member between the inner surface of the case and the seat surface of the base, a part of the inner circumferential edge of the sealing member is located closer to the polar column portion in the radial direction and another part of the inner circumferential edge of the sealing member located radially opposite to the part is located farther from the polar column portion, and the sealing member is located at a position at which the sealing member does not surround the circumference of the through hole. At this time, when attaching each electrode terminal to the case, the tip end of at least one of the tapered portions of the case and the terminal insulating member enters between the outer circumferential surface of the polar column portion and the inner circumferential edge of the sealing member. When the tapered portion enters the inside of the sealing member, the tapered portion moves a portion of the sealing member that is closer to the polar column portion away from the polar column portion in the radial direction. The tapered portion also moves a portion of the sealing member that is farther from the polar column portion toward the polar column portion in the radial direction. When the tapered portion completely enters the inside of the sealing member, the sealing member is located at a position at which the sealing member surrounds the tapered portion from radially outside. Since the tapered portion provided in the case is formed on the circumferential edge of the through hole and the terminal insulating member is inserted between the outer circumferential portion of the polar column portion in the radial direction and the inner circumferential portion of the through hole in the radial direction, the tapered portion locates the sealing member at a position at which the sealing member surrounds the circumference of the through hole. Accordingly, even if the sealing member is displaced in the radial direction of the through hole and does not surround the circumference of the through hole, the sealing member is easily located at a position at which the sealing member exhibits a sealing property in the attaching process of the electrode terminal.

The case may include a case body and a lid in which the through hole is arranged. In a cross-sectional shape of the sealing member in a facing direction between the base and the lid, the sealing member may include a first portion, which faces the lid, and a second portion, which faces the polar column portion, and the first portion and the second portion may be connected to each other by an inclined portion.

According to this, since the inclined portion is continuous at a position outside of the inner circumferential edge of the sealing member, the tip end of the tapered portion of the terminal insulating member contacts the inclined portion of the sealing member to move the sealing member even in a state in which a part of the inner circumferential edge of the sealing member contacts the polar column portion so that no gap is created between the sealing member and the polar column portion.

The terminal insulating member may have the tapered portion.

According to this, the terminal insulating member is provided to insulate the electrode terminal from the case or the lid. The tapered portion provided on the terminal insulating member ensures the insulation between the electrode terminal and the case or between the electrode terminal and the lid and locates the sealing member at a predetermined position.

Each of an inner surface of the lid and the terminal insulating member may have the tapered portion, and the tapered portion of each of the inner surface of the lid and the terminal insulating member may form a continuous surface.

According to this, since the terminal insulating member passes through the through hole of the lid, the terminal insulating member is located at a position that is closer to the polar column portion than the tapered portion of the lid is. Accordingly, the tapered portion of the terminal insulating member moves the sealing member first and the continuous surface is then formed by the lid and the tapered portion of the terminal insulating member. This further moves the sealing member by the tapered portion of the lid. Accordingly, the sealing member is greatly moved.

The seat surface of the base may include a groove, into which the tapered portion of the terminal insulating member is inserted. A circumferential wall, which linearly extends in the cross-sectional shape, may be formed continuously with a portion of the terminal insulating member that is closer to the lid than the tapered portion is.

According to this, the tapered portion passes through the inside of the sealing member and is inserted into the groove. This allows the outer circumferential surface of the circumferential wall having a linear cross-sectional shape to face the inner circumferential edge of the sealing member. Accordingly, when the internal pressure of the electrical storage device presses the sealing member in the radial direction, the linear circumferential wall receives the inner circumferential edge of the sealing member. This avoids the receiving of the sealing member by the inclined surface of the tapered portion, for example.

The tapered portion may be located between an inner circumferential edge of the sealing member and an outer circumferential surface of the polar column portion.

A nut formed of plastic may be threaded to the polar column portion of the electrode terminal from an outside of the case and the terminal insulating member may be formed integrally with the nut.

According to this, the threading of the nut for fixing the electrode terminal locates the sealing member at a predetermined position.

The electrical storage device is a rechargeable battery.

Effects of the Invention

The present invention easily locates a sealing member at a position at which the sealing member exhibits a sealing property.

BRIEF DESCRIPTION OF THE DRAWINGS

FIG. 1A is an exploded perspective view illustrating a rechargeable battery according to an embodiment;

FIG. 1B is a perspective view illustrating a terminal insulating member;

FIG. 7A is a cross-sectional view illustrating a state before the terminal insulating member is passed through;

FIGS. 10A and 10B are cross-sectional views illustrating the tapered portion, which enters a groove of a base;

FIGS. 11A and 11B are cross-sectional views illustrating another embodiment in which the terminal insulating member has a rounded tapered portion;

DETAILED DESCRIPTION OF THE PREFERRED EMBODIMENTS

Figure 2:
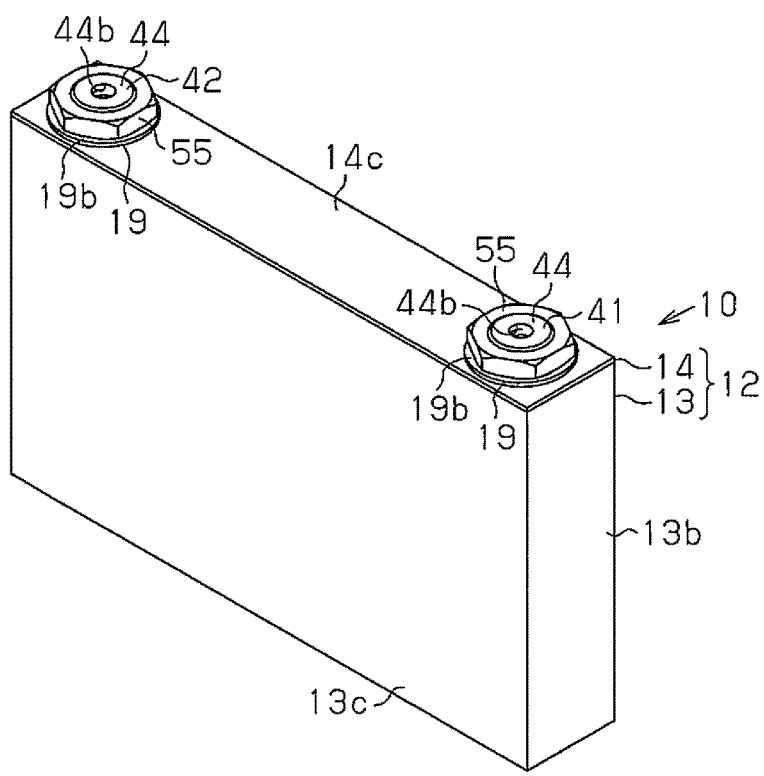
FIG. 2 is a perspective view illustrating an appearance of the rechargeable battery according to the embodiment.
Figure 3:
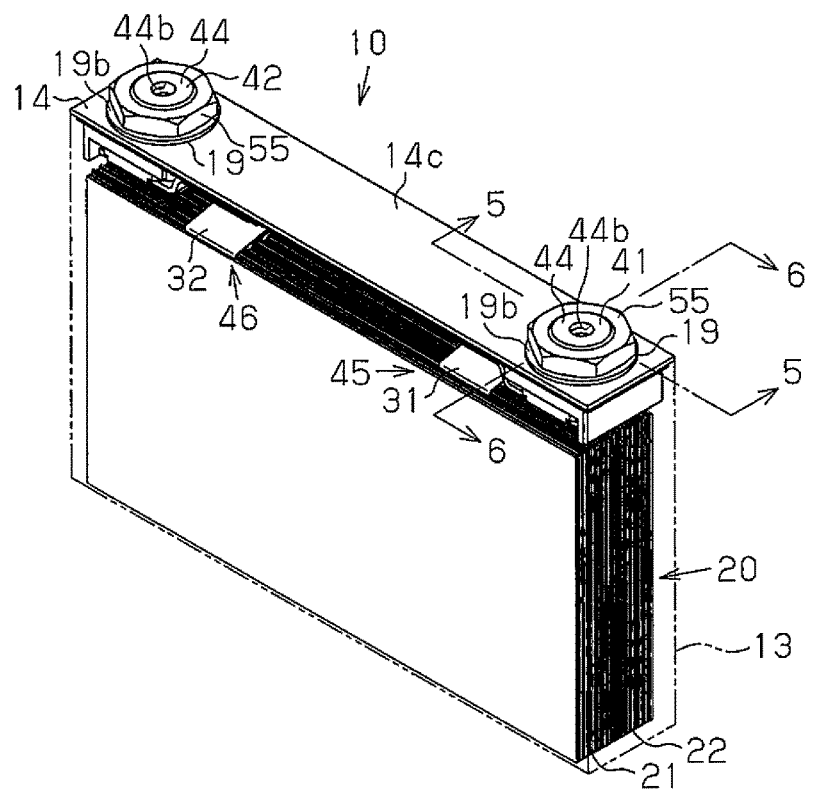
FIG. 3 is a perspective view illustrating a state in which a lid is formed integrally with an electrode assembly.

Hereinafter, one embodiment of the present invention will be described with reference to FIGS. 1 to 8.

As shown in FIGS. 1A to 3, in a rechargeable battery 10 as an electrical storage device, a metal case 12 accommodates an electrode assembly 20. The case 12 includes a box-like case body 13 having an opening 13d and a rectangular flat plate-like lid 14, which closes the opening 13d of the case body 13. The case body 13 and the lid 14 are formed of metal (e.g., stainless and aluminum). The lid 14 is joined to the case body 13 by laser welding. The case body 13 includes a rectangular-shaped base plate 13a, two short-side walls 13b, which project from two opposing short sides of the base plate 13a, and two long-side walls 13c, which project from two opposing long sides of the base plate 13a. The rechargeable battery 10 according to the present embodiment is a rectangular battery having a rectangular profile. The rechargeable battery 10 according to the present embodiment is a lithium ion battery.

Figure 6:
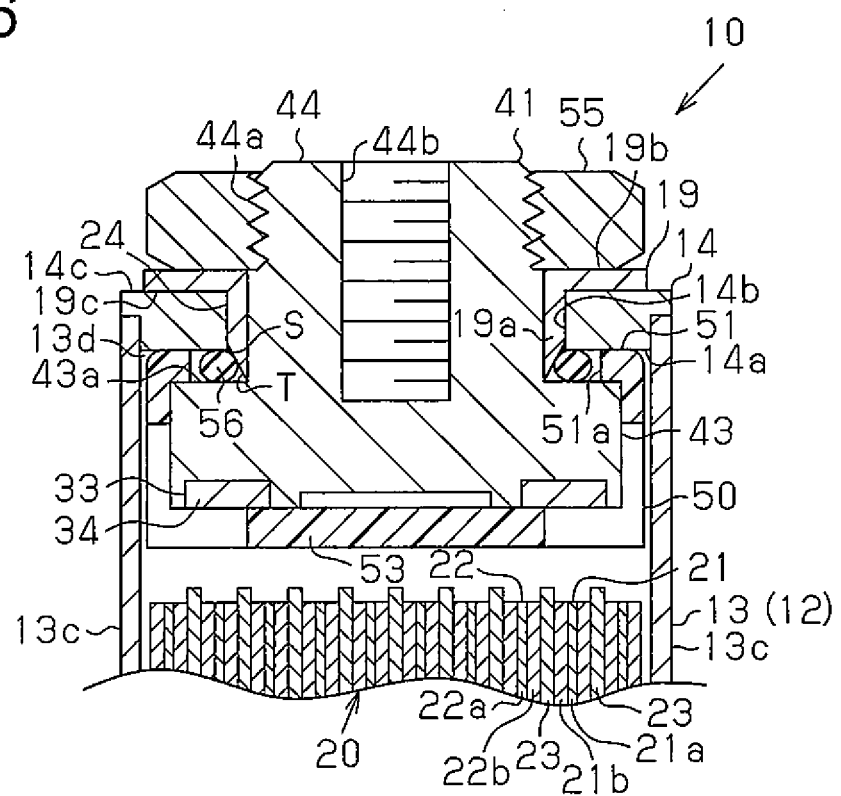
FIG. 6 is a cross-sectional view taken along line 6-6 of FIG. 3, illustrating the sealing structure of the positive electrode terminal.

As shown in FIG. 6, the electrode assembly 20 includes positive electrodes 21 and negative electrodes 22 and has a stacked body in which a separator 23 is located between each adjacent pair of the positive electrodes 21 and negative electrodes 22 to be layered. Each separator 23 insulates the corresponding positive electrode 21 and negative electrode 22 from each other. Each positive electrode 21 includes a rectangular positive electrode metal foil (in the present embodiment, aluminum foil) 21a and positive electrode active material layers 21b on the surfaces of the positive electrode metal foil 21a. Each negative electrode 22 includes a rectangular negative electrode metal foil (in the present embodiment, copper foil) 22a and negative electrode active material layers 22b on the surfaces of the negative electrode metal foil 22a.

As shown in FIG. 1, a positive electrode collector tab 31, which is shaped to protrude from the positive electrode metal foil 21a, is provided on a part of a side of each positive electrode 21. The positive electrode collector tabs 31 are arranged at the same positions of the corresponding positive electrodes 21, which configure the electrode assembly 20, and have the same shape. A negative electrode collector tab 32, which is shaped to protrude from the negative electrode metal foil 22a, is provided on a part of a side of each negative electrode 22. The negative electrode collector tabs 32 are arranged at the same positions of the corresponding negative electrodes 22, which configure the electrode assembly 20, and have the same shape.

The positive electrode collector tabs 31 are stacked such that the positive electrode collector tabs 31 are aligned in the stacking direction. In the same manner, the negative electrode collector tabs 32 are stacked such that the negative electrode collector tabs 32 are aligned in the stacking direction without overlapping the positive electrode collector tabs 31. A plurality of the positive electrode collector tabs 31 are bundled in the range from one end to the other end of the electrode assembly 20 in the stacking direction. Also, a plurality of the negative electrode collector tabs 32 are bundled in the range from one end to the other end of the electrode assembly 20 in the stacking direction in the same manner.

The electrode assembly 20 includes a positive electrode tab groups 45 configured by bundling the positive electrode collector tabs 31. The positive electrode tab groups 45 are welded to a positive electrode conductive member 33. The electrode assembly 20 includes a negative electrode tab groups 46 configured by bundling the negative electrode collector tabs 32. The negative electrode tab groups 46 are welded to a negative electrode conductive member 37.

The positive electrode conductive member 33 and the negative electrode conductive member 37 each include a rectangular plate-like terminal connecting portion 34. The positive electrode conductive member 33 and the negative electrode conductive member 37 each include a projecting portion 35, which projects from the terminal connecting portion 34, and a tab welding portion 36, which extends from the projecting portion 35 in a direction that away from the terminal connecting portion 34. Each tab welding portion 36 is rectangular plate-like. The tab welding portion 36 of the positive electrode conductive member 33 is welded to the positive electrode tab groups 45 of the electrode assembly 20, and the tab welding portion 36 of the negative electrode conductive member 37 is welded to the negative electrode tab groups 46 of the electrode assembly 20.

A positive electrode terminal 41 is welded to the terminal connecting portion 34 of the positive electrode conductive member 33, and a negative electrode terminal 42 is welded to the terminal connecting portion 34 of the negative electrode conductive member 37. The positive electrode terminal 41 and the negative electrode terminal 42 each include a rectangular plate-like base 43. A cylindrical polar column portion 44 projects from the center of each base 43. A seat surface 43a of each base 43 on the lid side surrounds the corresponding polar column portion 44 when each of the positive electrode terminal 41 and the negative electrode terminal 42 is viewed from the tip end of the corresponding polar column portion 44. Each polar column portion 44 includes an external thread 44a on the outer circumferential surface and an internal thread 44b in the inner circumferential surface of the polar column portion 44.

Figure 5:
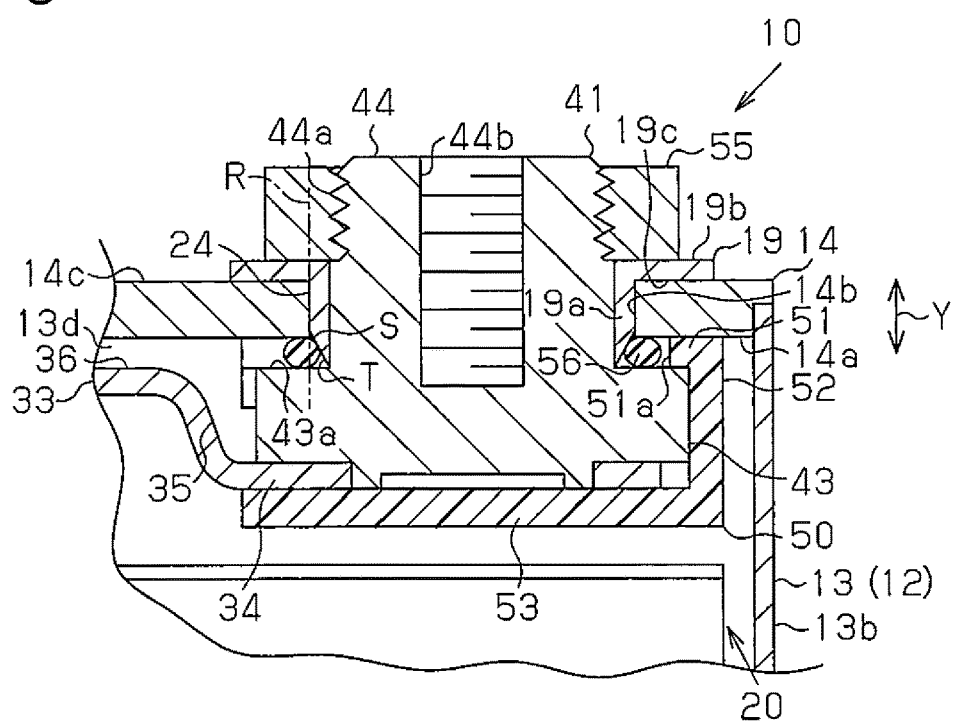
FIG. 5 is a cross-sectional view taken along line 5-5 of FIG. 3, illustrating a sealing structure of the positive electrode terminal.

As shown in FIGS. 1 and 5, an insulating cover 50 made of plastic is mounted on each base 43. Each insulating cover 50 includes a first insulating plate 51 sandwiched between the seat surface 43a of the corresponding base 43 and the inner surface 14a of the lid 14. Each first insulating plate 51 electrically insulates the lid 14 from the corresponding positive electrode terminal 41 and negative electrode terminal 42. Each first insulating plate 51 is positioned on the corresponding to the lid 14. Each first insulating plate 51 includes a through portion 51a, which passes through the first insulating plate 51 in the thickness direction, through which the corresponding polar column portion 44 passes. The inner circumferential edge of each first insulating plate 51 is arcuate. Each first insulating plate 51 includes a communicating portion 51b configured such that the through portion 51a opens in a side of the first insulating plate 51. The through portion 51a and the communicating portion 51b configure the first insulating plate 51 U-shaped in a plan view.

Of the end edges of each first insulating plate 51, from the end edge opposite to the communicating portion 51b across the through portion 51a, a second insulating plate 52 extends toward the electrode assembly 20. The second insulating plates 52 each electrically insulate the case body 13 from the corresponding positive electrode terminal 41 and negative electrode terminal 42. Each second insulating plate 52 is located on the side corresponding to the side walls 13b and 13c. Each second insulating plate 52 is rectangular plate-like and extends in a direction that is perpendicular to the first insulating plate 51. The extending length of each second insulating plate 52 from the first insulating plate 51 is set greater than the thickness of the corresponding base 43. In each second insulating plate 52, a third insulating plate 53 extends in the same direction as the first insulating plate 51 from a tip end of the second insulating plate 52 apart from the lid 14. The third insulating plate 53 electrically insulates the electrode assembly 20 from the positive electrode terminal 41 and the negative electrode terminal 42. Each third insulating plate 53 is located on the side corresponding to the electrode assembly 20. The second insulating plate 52 is rectangular plate-like. The gap between the facing surfaces of the first insulating plate 51 and the third insulating plate 53 is set slightly greater than the thickness of the corresponding base 43.

The above configured insulating covers 50 are mounted to the corresponding positive electrode terminal 41 and negative electrode terminal 42 from the short-side walls 13b of the case body 13. Each polar column portion 44 passes through the corresponding through portion 51a of the first insulating plate 51 such that the first insulating plate 51 surrounds the substantially entire circumferential portion of the polar column portion 44. Each first insulating plate 51 is supported on the corresponding seat surface 43a of the base 43.

Figure 4:
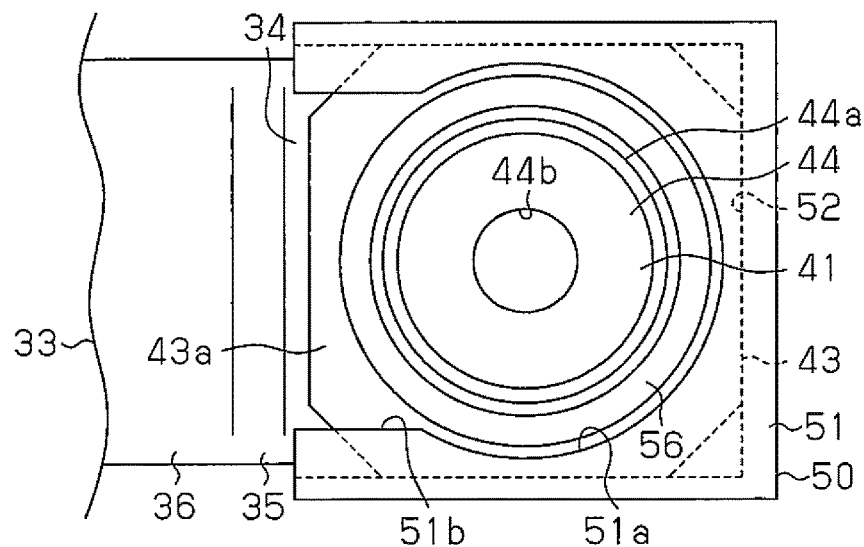
FIG. 4 is a plan view illustrating a positive electrode conductive member, a positive electrode terminal, and an upper insulating plate.
Figure 8A:
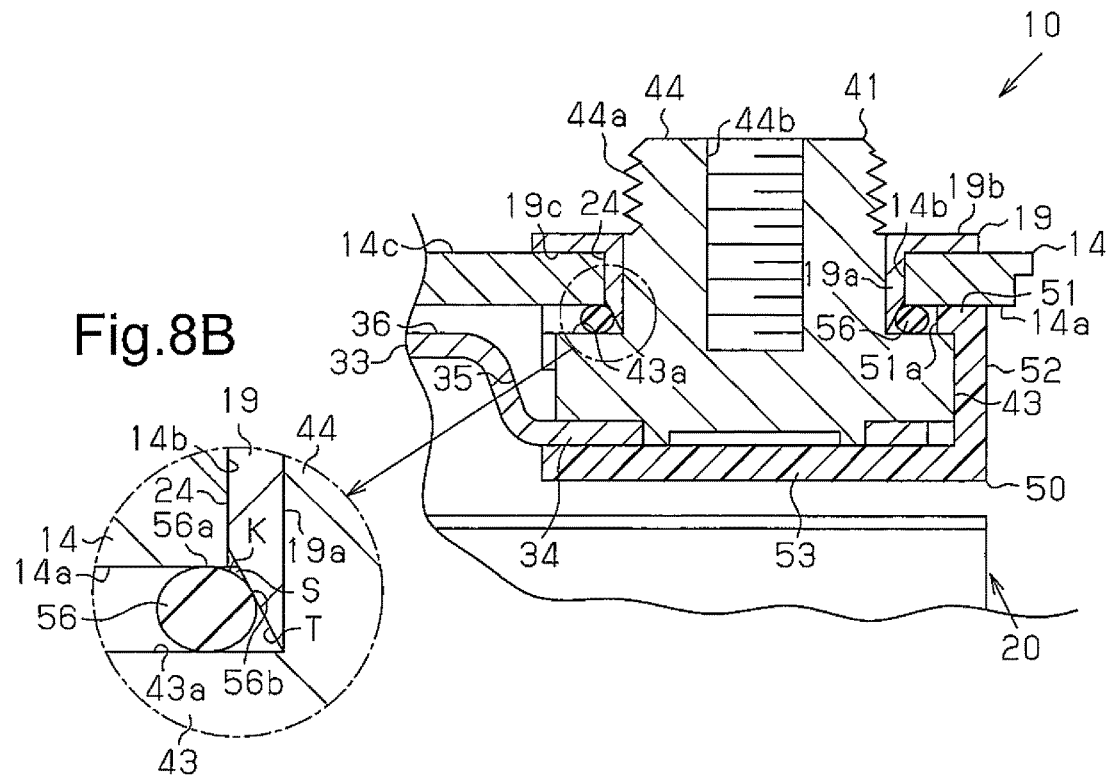
FIG. 8A and 8B are cross-sectional views illustrating the O-ring, which is arranged at a predetermined position by a tapered portion.
Figure 8B:
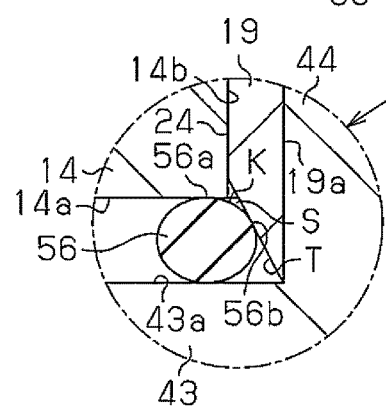

As shown in FIGS. 4 and 5, on the seat surface 43a of each base 43, an O-ring 56 as a sealing member is provided to surround the polar column portion 44 from the radially outside. The O-ring 56 is annular with a circular cross section. The O-ring 56 is formed of rubber materials. A half of the radial thickness of the O-ring 56 on the side of the outer circumferential edge is positioned outside of a reference line R, which extends in the thickness direction of the lid 14 and passes through the inner circumferential surface of the through hole 14b. The O-ring 56 is arranged inside the through portion 51a of the first insulating plate 51 in the radial direction of the polar column portion 44 and the substantially entire circumference of the O-ring 56 is surrounded by the first insulating plate 51. That is, the O-ring 56 is surrounded by the inner circumferential edge of the first insulating plate 51 other than the portion facing the communicating portion 51b. As shown in FIG. 8, the cross section of the O-ring 56 in the facing direction between the base 43 and the lid 14 is circular. Accordingly, an arcuately curved inclined portion K connects the end portion 56a of the O-ring 56 on the side facing the lid 14, i.e., the first portion facing the lid 14, and the end portion 56b of the O-ring 56 on the side facing the polar column portion 44, i.e., the second portion facing the polar column portion 44 through the tapered portion T to each other.

The columnar polar column portion 44, which passes through the through portion 51a of the first insulating plate 51, is located such that the polar column portion 44 passes from the inside of the case body 13 through the through hole 14b formed in the lid 14 and protrudes (is exposed) to the outside. The bases 43 of the positive electrode terminal 41 and negative electrode terminal 42 are each arranged in the case body 13. The cross-sectional area of each base 43, which is perpendicular to the axial direction of the polar column portion 44, along the seat surface 43a is set greater than the area of the through hole 14b. This prevents the base 43 from passing through the through hole 14b in the inside of the case body 13.

Each terminal insulating member 19 insulates the inner circumferential surface of the through hole 14b from the outer circumferential surface of the polar column portion 44. The terminal insulating member 19 includes a cylindrical ring 19a and a flange portion 19b, which extends from an end edge of the ring 19a to the outside.

As shown in FIGS. 1B and 5, the ring 19a includes a cylindrical circumferential wall 24 and a tapered portion T provided on the tip end of the circumferential wall 24, and the circumferential wall 24 is formed continuous on a portion that is closer to the lid 14 than the tapered portion T is. The circumferential wall 24 has a constant inner diameter and outer diameter in the axial direction of the ring 19a. The thickness of the circumferential wall 24 is constant. When an arrow Y shows the facing direction between the base 43 and the lid 14, in the cross-sectional shape in the facing direction, the outer circumferential surface of the circumferential wall 24 linearly extends in the facing direction.

The outer diameter of the cross-sectional shape of the tapered portion T in the facing direction is increased from the base 43 toward the lid 14 (toward the through hole 14b). The tapered portion T is inclined radially outside of the through hole 14b. The outer diameter of the tapered portion T is increased from the tip end of the tapered portion T toward the circumferential wall 24 in the facing direction, and the thickness is decreased toward the tip end. The cross-sectional shape of the tapered portion T in the facing direction is linearly inclined relative to the facing direction.

The ring 19a is located between the inner circumferential surface of the through hole 14b and the outer circumferential surface of the polar column portion 44, and the tip end of the tapered portion T contacts the seat surface 43a of the base 43. In the ring 19a as viewed in the axial direction of the polar column portion 44, the entire outer circumferential edge of the ring 19a is stacked on the inner circumferential edge of the O-ring 56. The tip end of the ring 19a apart from the flange portion 19b contacts the O-ring 56. In the flange portion 19b, a surface in which the ring 19a extends is defined as a locked surface 19c, which is locked by the outer surface 14c of the lid 14 to the outside of the through hole 14b.

A nut 55 is threaded to the external thread 44a of the polar column portion 44. The flange portion 19b of the terminal insulating member 19 is located between the nut 55 and the outer surface 14c of the lid 14, and the flange portion 19b electrically insulates the nut 55 from the lid 14. The threading of the nut 55 to the polar column portion 44 holds the flange portion 19b, the lid 14, and the first insulating plate 51 between the nut 55 and the base 43. The threading of the nut 55 also fastens the polar column portion 44 to the lid 14. In the fastened state, the O-ring 56 is compressed between the inner surface 14a of the lid 14 and the seat surface 43a of the base 43, closely contacts the inner surface 14a of the lid 14 and the seat surface 43a of the base 43, and surrounds the through hole 14b from the outer circumference to seal the through hole 14b.

Next, operation of the rechargeable battery 10 will be described with a manufacturing method.

First, in the positive electrode conductive member 33 and negative electrode conductive member 37, the base 43 of the positive electrode terminal 41 and the base 43 of the negative electrode terminal 42 are welded to the corresponding terminal connecting portions 34 to integrally and electrically connects the positive electrode conductive member 33 with the positive electrode terminal 41 and integrally and electrically connect the negative electrode conductive member 37 with the negative electrode terminal 42. Next, the tab welding portion 36 of the positive electrode conductive member 33 is welded to the positive electrode tab groups 45 of the electrode assembly 20, and the tab welding portion 36 of the negative electrode conductive member 37 is welded to the negative electrode tab groups 46 of the electrode assembly 20.

Figure 7A:
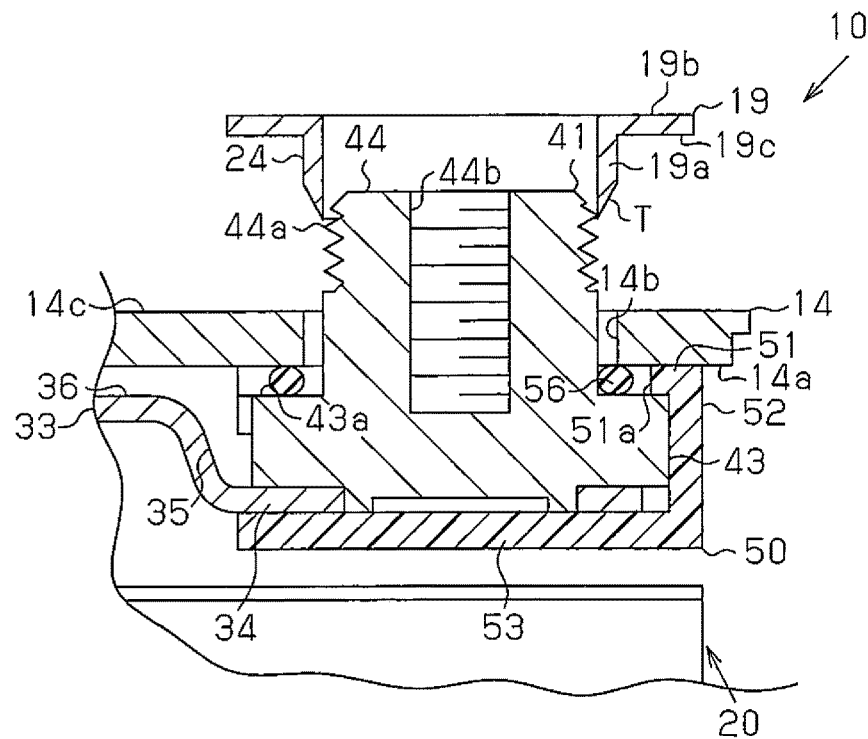
Figure 7B:
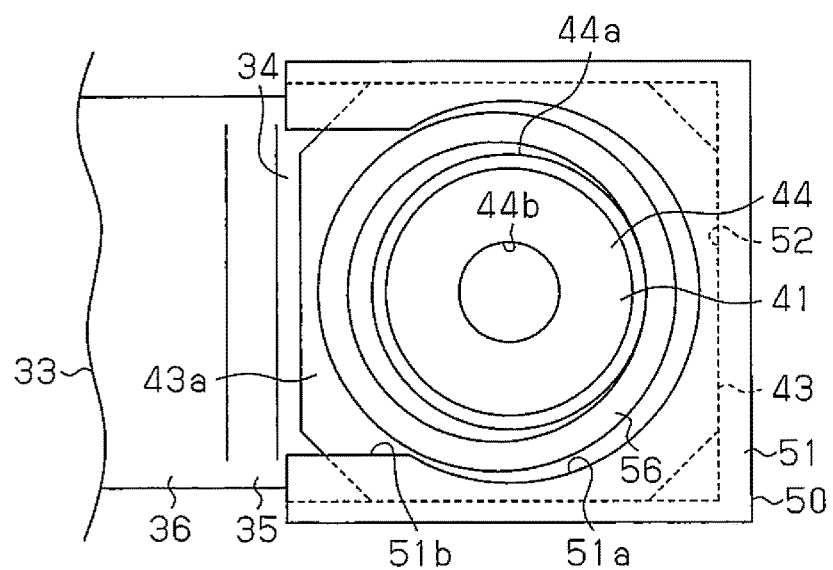
FIG. 7B is a plan view illustrating an O-ring, which is arranged displaced.

As shown in FIGS. 7A and 7B, the insulating covers 50 are mounted on the corresponding positive electrode terminal 41 and negative electrode terminal 42, the seat surface 43a of each base 43 supports the first insulating plate 51, and the third insulating plate 53 is located under the base 43. The insulating cover 50 is pushed until the second insulating plate 52 contacts the facing base 43.

Next, each O-ring 56 is mounted on the corresponding polar column portion 44 and located on the seat surface 43a of the base 43. It is assumed that a portion of the inner circumferential edge of the O-ring 56 in the circumferential direction is radially closer to the polar column portion 44, a portion of the O-ring 56 that is radially opposite to the closer portion is radially apart from the polar column portion 44 and located on the seat surface 43a, and the O-ring 56 is located at a position at which the O-ring 56 does not surround the circumference of the through hole 14b. In this state, the lid 14 is set such that the polar column portion 44 is passed through the through hole 14b, and the O-ring 56 supports the inner surface 14a of the lid 14. At this time, a part of the O-ring 56 is exposed to the inside of the through hole 14b.

As shown in FIG. 8, the ring 19a of the terminal insulating member 19 is inserted. Then, even if a part of the O-rings 56 contacts the polar column portion 44, the tip end of the tapered portion T of the ring 19a contacts the inclined portion K of the O-ring 56 to move the O-ring 56. Further, when the ring 19a is inserted, the outer circumferential surface of the tapered portion T slides on the inner circumferential edge of the O-ring 56. As the ring 19a is further inserted, the diameter of the tapered portion T is increased. Accordingly, the tapered portion T moves a portion of the O-ring 56 that is closer to the polar column portion 44 in the radial direction away from the polar column portion 44. This moves a portion of the O-ring 56 that is apart from the polar column portion 44 in the radial direction of the polar column portion 44 toward the polar column portion 44 at the same time.

The locked surface 19c of the flange portion 19b then contacts the outer surface 14c of the lid 14. This locates the O-ring 56 at a position at which the O-ring 56 surrounds the ring 19a. Since the terminal insulating member 19 is inserted between the outer circumferential portion of the polar column portion 44 and the inner circumferential portion of the through hole 14b in the radial direction of the polar column portion 44, the tapered portion T concentrically locates the O-ring 56 at a position at which the O-ring 56 surrounds the circumference of the through hole 14b.

Then, the nut 55 is threaded to the external thread 44a of the polar column portion 44. This brings the inner surface 14a of the lid 14 into contact with the first insulating plate 51 such that the lid pushes the O-ring 56 onto the base 43. As a result, the O-ring 56 closely contacts the inner surface 14a of the lid 14 and the seat surface 43a of the base 43 and is positioned to surround the circumference of the through hole 14b. Then, the case body 13 accommodates the electrode assembly 20, and the lid 14 is welded to the case body 13 to form the case 12. This manufactures the rechargeable battery 10.

The above described embodiment has the following advantages.

(1) Each tapered portion T is formed on the corresponding terminal insulating member 19. Each O-ring 56 is sandwiched between the lid 14 and the corresponding base 43. Accordingly, even if the O-ring 56 is displaced relative to the through hole 14b when the O-ring 56 is mounted on the polar column portion 44, the tapered portion T of the terminal insulating member 19 locates the O-ring 56 at a position at which the O-ring 56 surrounds the circumference of the through hole 14b at the time of attaching the positive electrode terminal 41 and negative electrode terminal 42 to the lid 14. Accordingly, even if the O-ring 56 is displaced relative to the through hole 14b and the O-ring 56 does not surround the circumference of the through hole 14b, the O-ring 56 is easily located at a position at which the O-ring 56 surrounds the circumference of the through hole 14b, i.e., at a position at which the O-ring 56 exhibits its sealing property at the same time of attaching the positive electrode terminal 41 and negative electrode terminal 42 to the lid 14.

(2) The terminal insulating member 19 has the tapered portion T and the ring 19a is located closer to the polar column portion toward the tip end of the ring 19a. Accordingly, when the terminal insulating member 19 passes through the through hole 14b, the tip end of the tapered portion T easily enters between the inner circumferential edge of the O-ring and the polar column portion. This limits the compression of the O-ring.

(3) The terminal insulating member 19 has the tapered portion T, which contacts the O-ring 56 from the side corresponding to the lid 14. Accordingly, for example, even if the internal pressure in the case 12 is increased and applied to the O-ring 56, the terminal insulating member 19 restricts the O-ring 56 from exiting the case 12 through between the inner circumferential surface of the through hole 14b and the outer circumferential surface of the polar column portion 44.

(4) As the sealing member, the O-ring 56 with a circular cross-sectional shape in the facing direction between the lid 14 and the base 43 is employed. The inclined portion K connects the end portion 56a of the O-ring 56 on the side facing the lid 14 side, i.e., the first portion facing the lid 14, and the end portion 56b of the O-ring 56 on the side facing the polar column portion 44, i.e., the second portion facing the polar column portion 44 through the tapered portion T to each other. Accordingly, when each O-ring 56 is located on the seat surface 43a of the corresponding base 43, the inclined portion K of the O-ring 56 and the polar column portion 44 are ensured to create the space S. Accordingly, when the terminal insulating member 19 passes through the through hole 14b, the tapered portion T enters the space S so that the tapered portion T is ensured to move the O-ring 56.

(5) The cross-sectional shape of each tapered portion T in the facing direction between the lid 14 and the corresponding base 43 is linearly inclined relative to the facing direction. Accordingly, the sliding of the tapered portion T on the O-ring 56 smoothly moves the O-ring 56.

(6) The first insulating plate 51 of the insulating cover 50 is located between the lid 14 and the base 43 when the nut 55 is threaded to the external thread 44a of the polar column portion 44. Accordingly, the first insulating plate 51 serves as a spacer between the lid 14 and the base 43 to limit an excessive threading of the nut 55. Therefore, the first insulating plate 51 is located to limit the excessive compression of the O-ring 56.

The above described embodiment may be modified as follows.

Figure 9A:
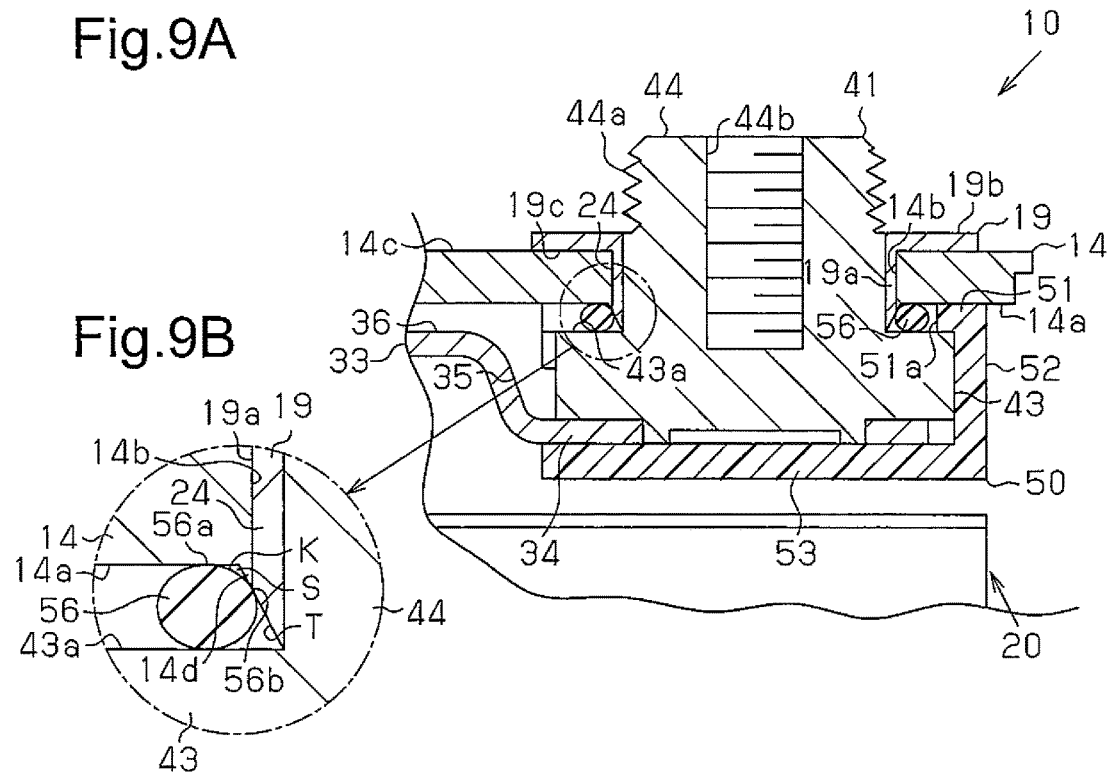
FIGS. 9A and 9B are cross-sectional views illustrating the tapered portions of the lid and the terminal insulating member.
Figure 9B:
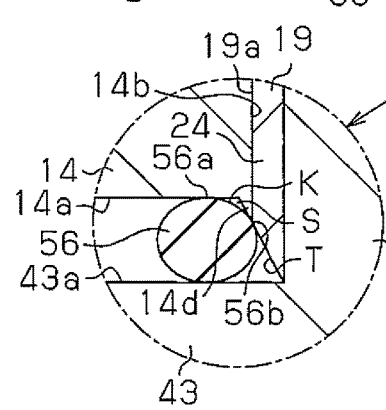

As shown in FIG. 9, on the inner surface 14a of the lid 14, an annular guide portion 14d may be provided to protrude from the circumference of the through hole 14b. The guide portion 14d has a tapered portion T with a cross-sectional shape in the facing direction between the lid 14 and each base 43, which is inclined to the outside in the radial direction of the through hole 14b from the base 43 as the tip end side to the lid 14 as the basal end side. The outer diameter of the cross-sectional shape of the tapered portion T is increased from the base 43 toward the lid 14.

In such a configuration, it is assumed that when each O-ring 56 is mounted on the polar column portion 44 and located on the seat surface 43a to sandwich the O-ring 56 between the lid 14 and the corresponding base 43, the O-ring 56 is located at a position at which the O-ring 56 does not surround the circumference of the through hole 14b. At this time, when attaching the positive electrode terminal 41 and the negative electrode terminal 42 to the lid 14, the tip end of the tapered portion T of each terminal insulating member 19 enters between the outer circumferential surface of the polar column portion 44 and the inner circumferential edge of the O-ring 56. When the tapered portion T slides on the inner circumferential edge of the O-ring 56, the O-ring 56 is slightly moved. Further, when the tapered portion T of each guide portion 14d on the lid 14 enters the inside of the O-ring 56, the tapered portion T of the lid 14 further moves the O-ring 56. As a result, the use of the tapered portions T of the terminal insulating member 19 and the lid 14 further moves the O-ring 56 than in the case of use of only the tapered portion T of the terminal insulating member 19. This allows the use of an O-ring with a greater diameter, for example.

The tapered portion T need not be provided on the terminal insulating member 19. Only the tapered portion T of the guide portion 14d provided on the lid 14 may be employed.

As shown in FIG. 10, the seat surface 43a of each base 43 has an annular groove 43b in the outer circumferential portion of the polar column portion 44. In the terminal insulating member 19, the circumferential wall 24 is further extended in the facing direction than in the embodiment to set the length of the circumferential wall 24 greater than or equal to the distance between the inner surface 14a of the lid 14 and the seat surface 43a of the base 43. The tapered portion T may enter the groove 43b when the terminal insulating member 19 passes through the through hole 14b.

In the above configuration, when the tapered portion T passes through the inside of the O-ring 56 to enter the groove 43b, not the tapered portion T but the outer circumferential surface of the circumferential wall 24 faces the inner circumferential edge of the O-ring 56. Then, when the internal pressure of the rechargeable battery 10 radially presses the O-ring 56 toward the ring 19a, the flat surface-like circumferential wall 24 receives the inner circumferential edge of the O-ring 56.

According to the embodiment, the cross-sectional shape of the tapered portion T in the facing direction between the lid 14 and each base 43 is linearly inclined to the outside in the radial direction of the through hole 14b from the base 43 toward the lid 14. However, the cross-sectional shape is not limited to this. As long as the cross-sectional shape of the tapered portion T is inclined to the outside in the radial direction of the through hole 14b from the base 43 toward the lid 14, the tapered portion T need not be linearly inclined. The tapered portion T may be curved to the outside to be arcuately shaped or curved to the inside to be arcuately shaped. As shown in FIG. 11, the cross-sectional shape of the tip end of the tapered portion T may be rounded in which the linear side of the tapered portion T is continuous with the rounded portion. The formation of the rounded portion on the tip end limits micro damage to the O-ring 56 when the terminal insulating member 19 and the O-ring 56 are brought into contact with each other.

Figure 12:
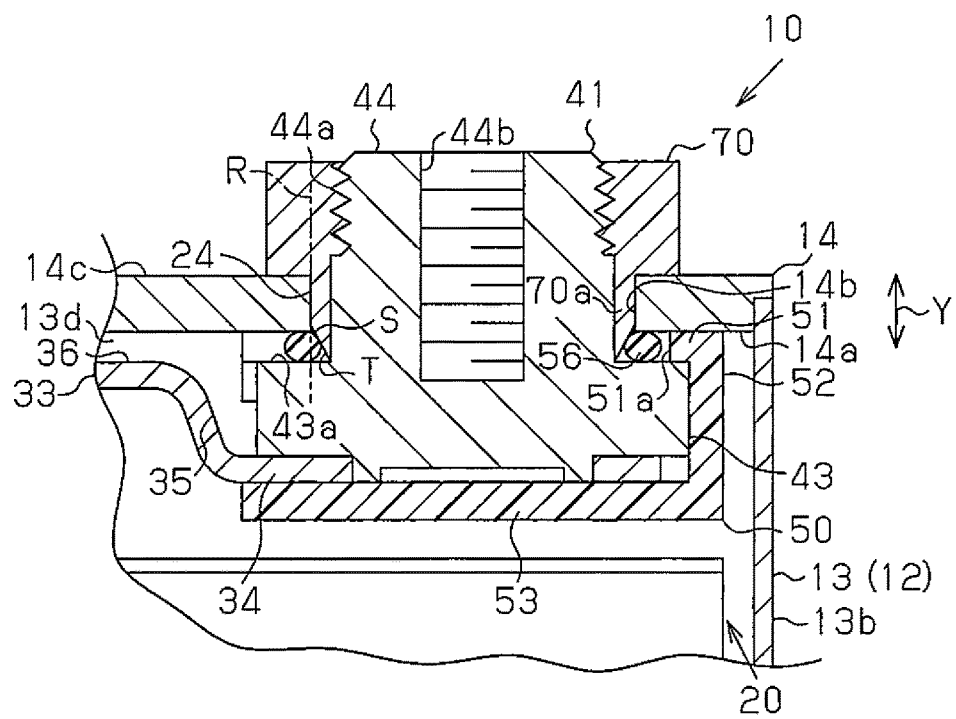
FIG. 12 is a cross-sectional view illustrating another embodiment in which a nut and the terminal insulating member are formed integrally with each other.
Figure 13:
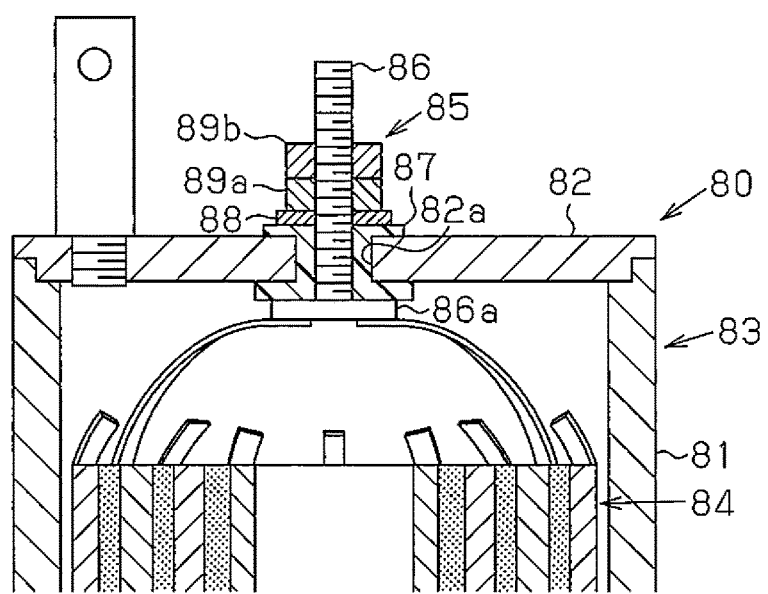
FIG. 13 is a diagram illustrating a prior art of Patent Document 1.
Figure 14:
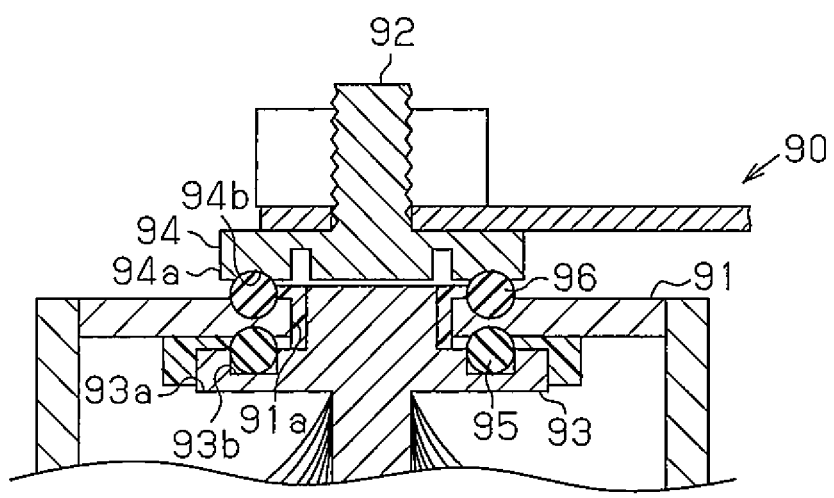
FIG. 14 is a diagram illustrating a prior art of Patent Document 2.

According to the embodiment, the nut 55, the lid 14, and the terminal insulating member 19 are separate members. However, the nut 55 may be configured integrally with the terminal insulating member 19 and the present invention may be applied to such a configuration. For example, as shown in FIG. 12, the nut 70 formed of hard plastic also serves as a flange portion of the terminal insulating member. A cylindrical ring 70a may be molded integrally with the lower portion of the nut 70. Even in such a configuration, the tapered portion T may be provided on the tip end (lower end) of the ring 70a to move the O-ring 56 to a predetermined position.

According to the embodiment, the sealing member is embodied by the O-ring 56 with a circular cross section in the facing direction between the lid 14 and each base 43. However, as long as the inclined portion connects the end portion of the sealing member on the side corresponding to the lid 14, i.e., the first portion facing the lid 14 and the end portion of the sealing member on the side corresponding to the polar column portion 44, i.e., the second portion facing the polar column portion to each other, the cross-sectional shape of the sealing member is not limited to circular. Other cross-sectional shapes may be employed.

According to the embodiment, the sealing member is embodied by the O-ring 56 with a circular cross section. However, the sealing member may be changed to other gaskets formed of rubber or plastic such as an O-ring with a rectangular cross section.

The number of the positive electrodes 21 and negative electrodes 22, which configure the electrode assembly 20, may be appropriately changed.

The case 12 may be shaped to be cylindrical or elliptic cylindrical.

The present invention may be embodied by a nickel hydrogen rechargeable battery as an electrical storage device or an electric double layer capacitor.

DESCRIPTION OF THE REFERENCE NUMERALS

K . . . inclined portion, S . . . space, T . . . tapered portion, 10 . . . rechargeable battery as an electrical storage device, 13 . . . case body, 13*d* . . . opening, 14 . . . lid as a case, 14*a* . . . inner surface, 14*b* . . . through hole, 19 . . . terminal insulating member, 20 . . . electrode assembly, 24 . . . circumferential wall, 41 . . . positive electrode terminal as an electrode terminal, 42 . . . negative electrode terminal as an electrode terminal, 43 . . . base, 43*a* . . . seat surface, 43*b* . . . groove, 44 . . . polar column portion, 56 . . . O-ring as a sealing member, 56*a* . . . end portion as a first portion, and 56*b* . . . end portion as a second portion.

The invention claimed is:

1. An electrical storage device comprising:
a case having a through hole, wherein the case includes a case body and a lid in which the through hole is arranged;
an electrode assembly accommodated in the case;
an electrode terminal, which passes through the through hole and is electrically connected to the electrode assembly, wherein the electrode terminal includes a base, which is located in the case and has a cross-sectional area that is greater than an area of the through hole, and a polar column portion, which projects from the base and is arranged to pass from an inside of the case through the through hole and protrudes to an outside of the case;
a terminal insulating member, which is inserted between an inner circumferential surface of the through hole and an outer circumferential surface of the polar column portion, which faces the inner circumferential surface, wherein the terminal insulating member includes a circumferential wall which surrounds the polar column portion; and
an annular sealing member sandwiched between an inner surface of the lid and a seat surface of the base, which faces the inner surface of the lid,
wherein a tip end of the terminal insulating member on a side corresponding to the seat surface of the base has a tapered portion, and a cross-sectional shape of the tapered portion in a direction in which the base and the case inner surface face each other is inclined to the outside in a radial direction of the through hole from the side corresponding to the base toward the through hole,
wherein the tapered portion is located between an inner circumferential edge of the sealing member and an outer circumferential surface of the polar column portion, and
wherein the sealing member surrounds at least one of the tapered portion and the circumferential wall of the terminal insulating member.

2. The electrical storage device according to claim 1, wherein
a cross-section of the sealing member in a facing direction between the base and the lid, includes a first portion, which faces the lid, and a second portion, which faces the polar column portion, and
the first portion and the second portion are connected to each other by an inclined portion.

3. The electrical storage device according to claim 2, wherein the inner surface of the lid has another tapered portion, and the tapered portion of the inner surface of the lid and the tapered portion of the terminal insulating member form a continuous surface.

4. The electrical storage device according to claim 2, wherein
the seat surface of the base includes a groove, into which the tapered portion of the terminal insulating member is inserted, and
the circumferential wall, which linearly extends in the cross-sectional shape, is formed continuously with a portion of the terminal insulating member that is closer to the lid than the tapered portion is.

5. The electrical storage device according to claim 1, wherein a nut formed of plastic is threaded to the polar column portion of the electrode terminal from an outside of the case and the terminal insulating member is formed integrally with the nut.

6. The electrical storage device according to claim 1, wherein the electrical storage device is a rechargeable battery.

* * * * *